May 4, 1954
R. P. LOWE
2,677,466
CORE FOR FILTER ELEMENTS
Filed Feb. 8, 1951
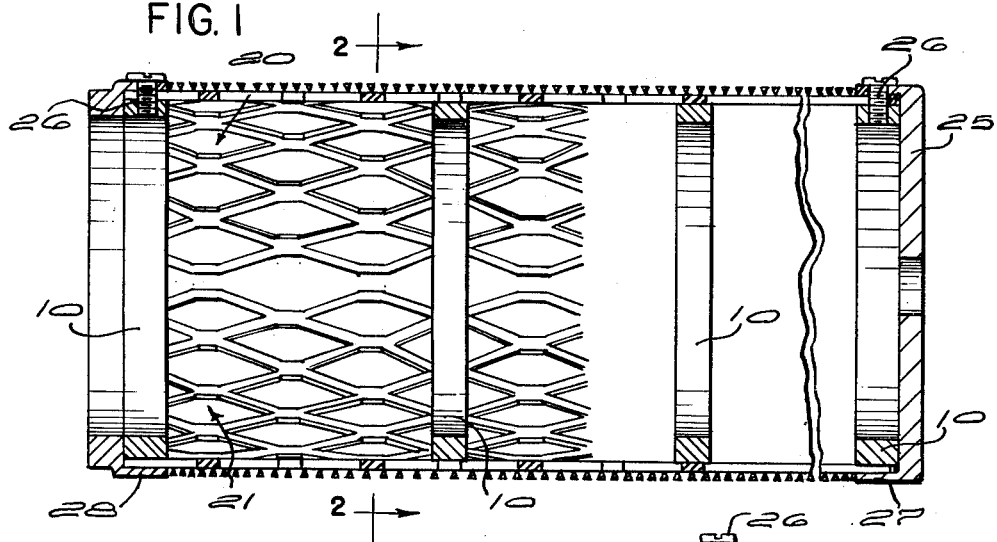
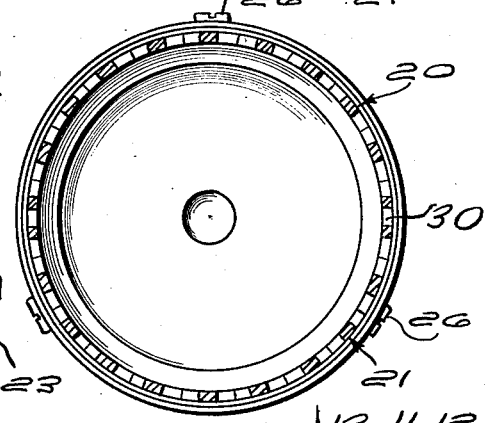
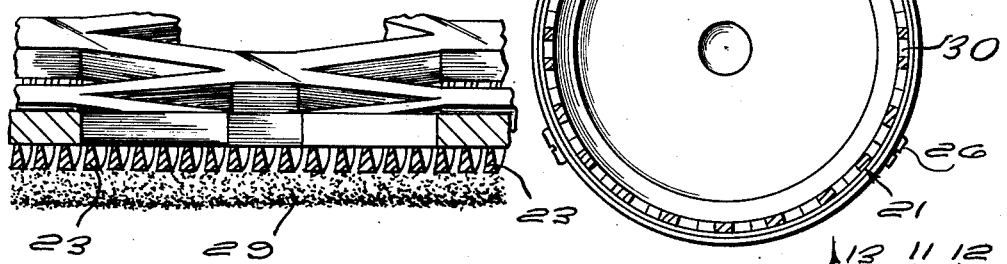
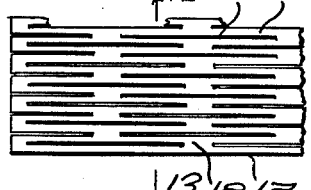
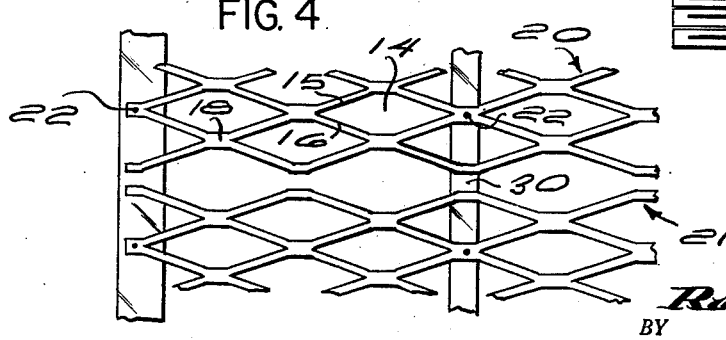
INVENTOR.
*Rudy P. Lowe*
BY
*Barlow & Barlow*
*Attorneys*

Patented May 4, 1954

2,677,466

UNITED STATES PATENT OFFICE 2,677,466

CORE FOR FILTER ELEMENTS

Rudy P. Lowe, Cranston, R. I., assignor to Proportioneers, Inc., a corporation of Rhode Island Application February 8, 1951, Serial No. 209,951

3 Claims. (Cl. 210—169)

This invention relates to a filter element of the type in which backwashing occurs to clear the filter element after it has been used to accumulate a maximum of sludge, of which it is designed to collect.

In the filtering of water or some such material, a plurality of cylindrical filter cores are often provided within a casing and some earthy material such as diatomaceous earth is accumulated on cores to form the filter elements, after which the water or other material to be filtered is caused to pass into the casing through the diatomaceous earth accumulated on the cylindrical cores and then discharged through the center of the core of the filter element. When it is desired to clean the filter, a backwashing occurs to discharge the diatomaceous earth from the cylindrical core and a fresh charge of diatomaceous earth is introduced to coat the cylindrical core and provide the desired filtering medium. In the use of a filter element of this character, it has heretofore been customary to provide some sort of a core formed of sheet metal with punched out openings. These openings may take various shapes but are frequently elliptical or generally rectangular, possibly with pointed ends. The punching out of sheet stock for this purpose is expensive and so weakens the sheet material that a rather heavy weight sheet must be provided in order to withstand the strains to which it is subjected after being so weakened.

An object of this invention is to provide a filter element core which is so constructed as to reduce the cost of providing a core of this character.

Another object of this invention is to provide a stronger core from equal gauge metal or to provide a core which will have the same strength as the sheet metal cores heretofore provided but may be of a thinner gauging metal.

Another object of this invention is to obtain holes in the sheet stock at considerably less expense than is required by a punching out of the sheet stock.

Another object of this invention is to reduce the blocked areas which the core usually provides by reason of the construction of the core.

With these and other objects in view, the invention consists of certain novel features of construction, as will be more fully described and particularly pointed out in the appended claims.

In the accompanying drawings:

Figure 1 is a sectional view through the filter core;

Figure 2 is a section on line 2—2 of Figure 1;

Figure 3 is an enlarged fragmental detail in section to show the helically wound strip about the sheet metal core and with a filter aid deposited therein;

Figure 4 is a fragmental detail showing the juncture line between two of the semi-cylindrical sections; and Figure 5 is a plan view illustrating a sheet of material slit before expanded.

In proceeding with this invention, I provide what I term as expanded metal, by which I mean a sheet of metal which has been slit at intervals with the slits spaced apart and in tandem relation in several parallel rows but with adjacent rows having the slits staggered so that the slits terminate in overlapping relation in a a symmetrical arrangement. After this slitting, the metal is pulled in opposite directions at right angles to the line of slits so as to spread the portions of the metal at either side of the slits and provide substantially diamond-shaped openings, with the portions of the metal which are left being disposed in parallel diagonals, extending in opposite directions with relation to original parallel slits. This expanded metal is then formed in half cylinders and two are secured by welding upon a series of circular rings or ribs placed at spaced intervals.

With reference to the drawings, I have provided a plurality of rings or circular ribs 10 and also have provided expanded metal which is formed by providing slits 11 as shown in Figure 5 and then pulling in opposite directions as shown by arrows 13 so as to expand this metal into substantially the form shown in Figures 1 and 4, thus providing openings 14 in the sheet stock with narrow strips 15 and 16 of metal extending in opposite diagonals to the original direction of the slits 11. The sheet stock after being expanded is cut along the connecting portions 18 between the diagonals 15 and 16 into the size desired and then are bent or pressed into half cylinder shape, one of these being designated 20 in Figure 2 and the other 21 in Figure 2. These semi-cylindrical portions 20 and 21 are then assembled upon the circular ribs or rings 10 and connected thereto by spot welding 22, as seen in Figure 4. A slight space 30 is left between the portions 18 at the edges of the cylindrical halves 20 and 21 so as to permit of some expansion due to change of temperature.

A strip of material or wire 23 of substantially dove-tail cross section, as seen more clearly in Figure 3, is helically wound about the cylinder of expanded metal thus formed. Spacing between the outer edges of the turns of wire provide the slots or passage through which filtrate material may pass but are sufficiently close to prevent passage of the particles of powdered filter material to be coated thereon. Even though the slots come opposite one of the portions 18 as the slot extends on either side thereof, there will be very little blocked area, the portions 18 being less in area than where openings are punched out as heretofore.

The winding of the wire 23 upon the cylindrical core requires a core of substantial strength in order that it will not collapse and it is pointed out that the arching of the expanded metal serves in effect to raise the portion 18 of the stock while leaving four legs extending therefrom in widely spread relation, which gives a triangulation and bridge effect which strengthens the core materially and forms it functionally rigid.

Caps 25 slide over the ends of the core of expanded metal formed and substantially abut the helical turns of wire 23. These caps are secured in place by cap screws 26 extending through the cap flanges 27 and 28 and entering the circular ribs or rings 10 at the ends of the core.

After this core is formed, it is assembled in a filter casing and a deposit of filter aid or powdered filtering material 29 is provided which collects upon the outer surface of the wire and provides the element which collects particles that are in the water to be passed through the filter element. The filtrate is extracted from the center of the core.

I claim:

1. In a liquid filter, a support and under drain comprising a functionally rigid tubular core, a narrow strip of material supported by said core and tightly wound helically about the core, and a powdered filtering medium coated on said helically wound material, said helically wound material being spaced to provide a filtrate passage and yet being sufficiently close to support said powdered medium, said core being of expanded metal with the openings therethrough so arranged with reference to the helical filtrate passage as to be staggered and overlap along the helical passage whereby inward drainage may occur of such extent as to provide no substantial additional pressure loss across the filtering medium and the helically wound material.

2. A support as in claim 1 wherein the openings in the expanded metal are of diamond shape.

3. In a filter as in claim 1 wherein the cross section of the helically wound material is of dove tail shape with the narrow edge innermost.

References Cited in the file of this patent

UNITED STATES PATENTS

| Number | Name | Date |
| --- | --- | --- |
| 559,440 | Conrader | May 5, 1896 |
| 679,131 | Thompson | July 23, 1901 |
| 2,070,073 | Walton | Feb. 9, 1937 |
| 2,081,198 | Hahn | May 25, 1937 |
| 2,128,539 | Manning | Aug. 30, 1938 |
| 2,212,647 | Nugent | Aug. 27, 1940 |
| 2,301,430 | Malanowski | Nov. 10, 1942 |
| 2,339,703 | Kamrath | Jan. 18, 1944 |
| 2,341,097 | Heebink | Feb. 8, 1944 |
| 2,352,732 | Nugent | July 4, 1944 |
| 2,413,991 | Newman | Jan. 7, 1947 |
| 2,420,414 | Briggs | May 13, 1947 |
| 2,475,561 | Cooperider et al. | July 5, 1949 |
| 2,485,547 | Blau | Oct. 25, 1949 |